D. H. COLES.
INTERNAL COMBUSTION ENGINE.
APPLICATION FILED OCT. 16, 1909. RENEWED APR. 1, 1912.
1,026,563.
Patented May 14, 1912.
2 SHEETS—SHEET 1.
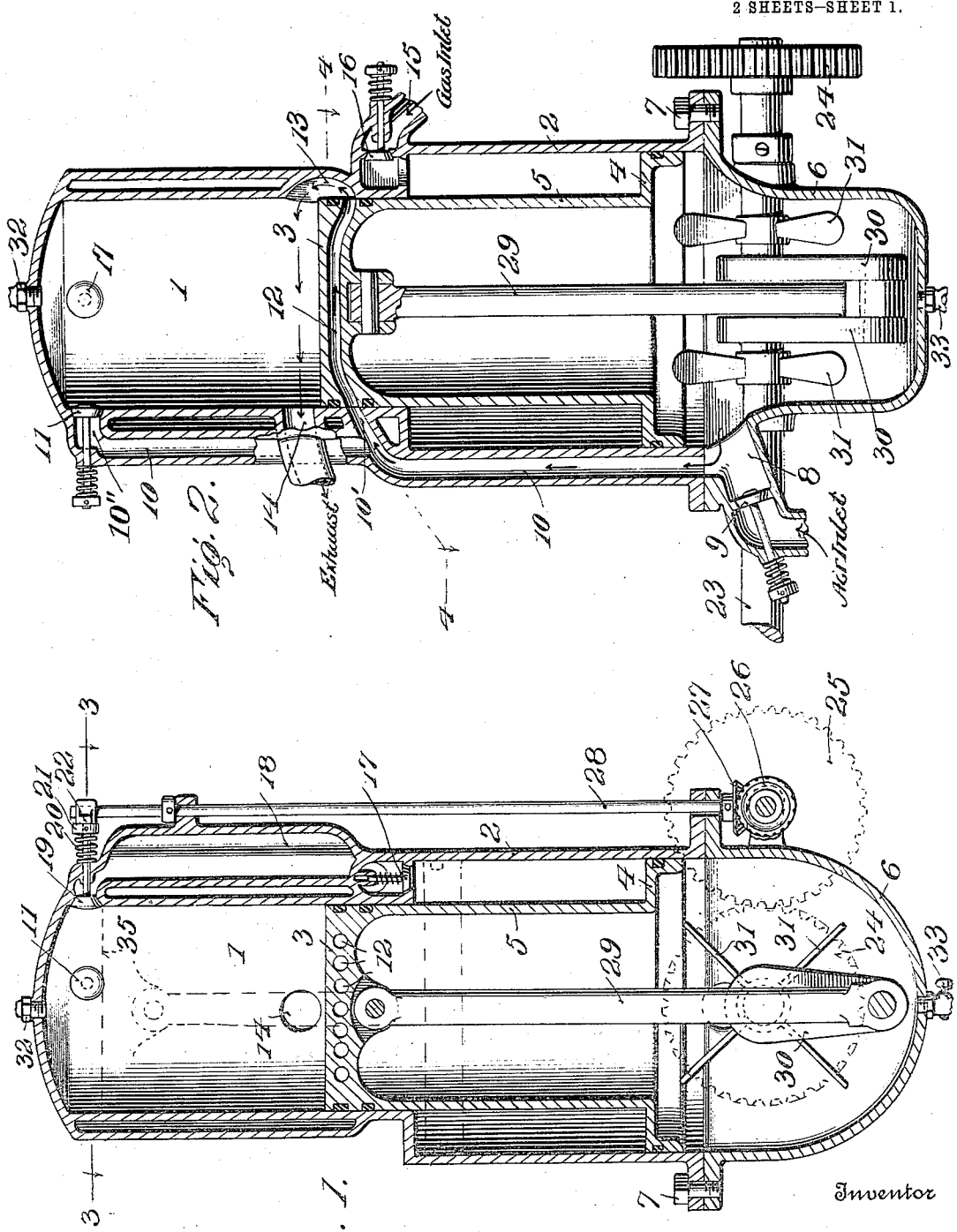

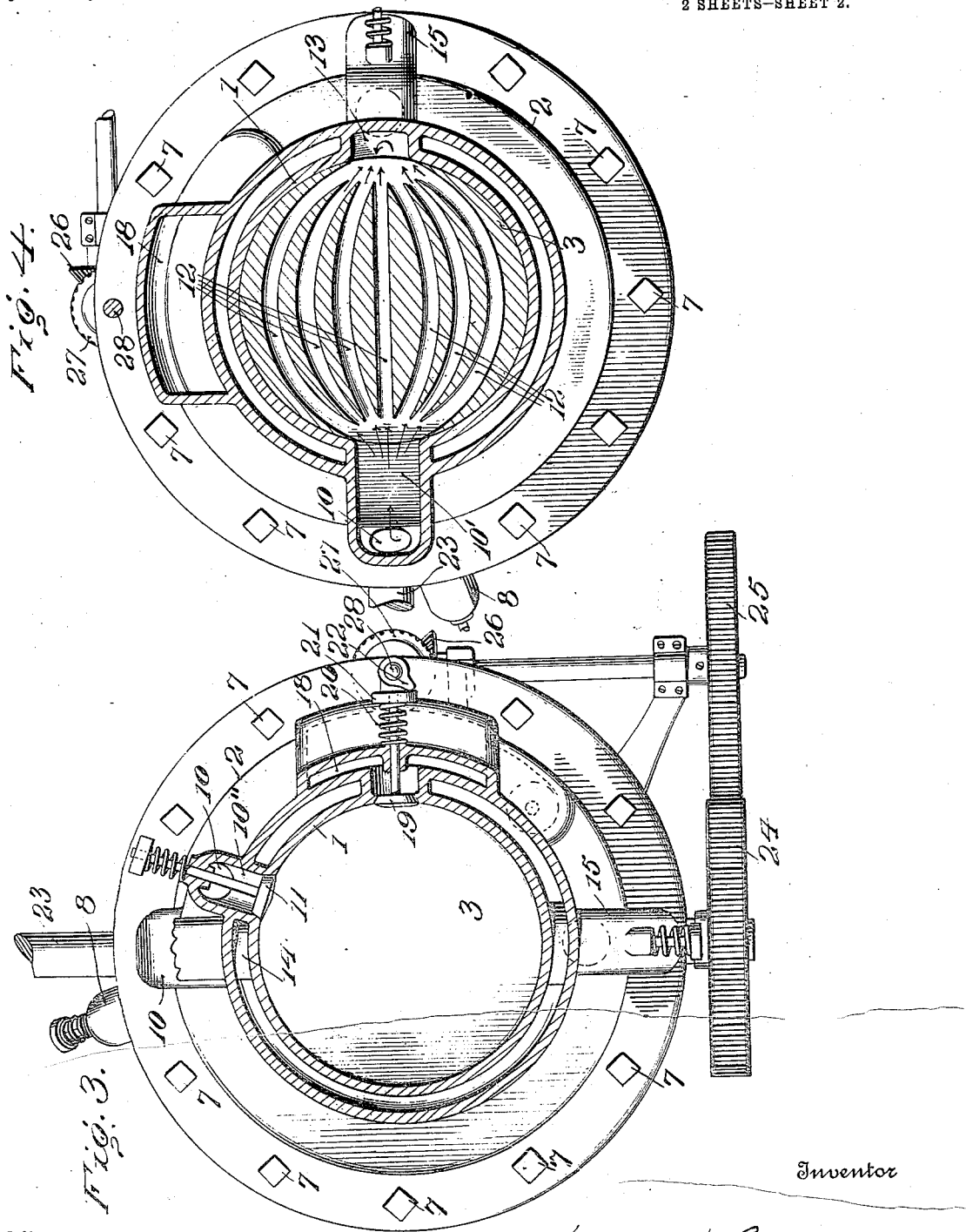

UNITED STATES PATENT OFFICE.

DAVID H. COLES, OF BROOKLYN, NEW YORK, ASSIGNOR, BY MESNE ASSIGNMENTS, TO REQUA MOTOR COMPANY, A CORPORATION OF NEW YORK.

INTERNAL-COMBUSTION ENGINE.

1,026,563.     Specification of Letters Patent.     Patented May 14, 1912.

Application filed October 16, 1909, Serial No. 523,044. Renewed April 1, 1912. Serial No. 687,773.

*To all whom it may concern:*

Be it known that I, DAVID H. COLES, of Brooklyn, New York, have invented a new and useful Improvement in Internal-Combustion Engines, which invention is fully set forth in the following specification.

This invention relates to internal combustion engines, and has for its objects to increase the speed of the piston in such engines while avoiding increased heating and danger of pre-ignition of the gas charge; to secure thorough scavenging of the products of combustion; and to increase the power of the engine.

A further object of my invention is to provide for circulation of the cooling fluid about the piston rod and neighboring parts of the cylinder, and to generally improve the engine construction.

While my improvements relate more particularly to explosive engines of the two-cycle type, yet they are not necessarily so restricted, but may be incorporated in explosive engines of any cycle.

In a two-cycle engine, when speeded up to 1800 to 2000 revolutions per minute, heating of the piston becomes excessive, and pre-ignition of the charge is apt to occur. While the same disadvantage arises in a four-cycle engine, it does not arise to the same extent, because the products of combustion remain in the cylinder for a shorter time for the same number of explosions per minute than in the two cycle type of engines. A further disadvantage arises in speeding explosive engines because of the low power developed in the cylinder by reason of an inadequate charge of gas present therein during the compression stroke. The piston moves so rapidly that time is insufficient for the piston to suck in a charge at atmospheric pressure without producing a partial vacuum in the cylinder. The initial charge at the end of each suction stroke diminishes in mass with increase of velocity of the piston, thereby developing less energy. Increased speed also increases the difficulty of scavenging the products of combustion, the presence of which contaminates the explosive charge and lessens power, while increasing fouling.

By means of my invention I overcome the above objections and secure the objects above described by providing an explosive engine with means for introducing into the power cylinder at or near the end of the power stroke a cooling fluid, such as air, the whole or a part of which passes through the piston whereby the piston may be internally cooled and the products of combustion scavenged from the cylinder. In the preferred form of my improvement I provide the piston with one or more cooling passages and provide the power cylinder with one or more air supply ports, preferably two, one at each end of the cylinder. One of these ports registers with the piston passages when the piston nears or reaches the end of its power stroke, while the other air supply port is controlled by a valve which opens to deliver a blast of air directly into the cylinder after the charge has expended its energy on the piston. The air supply is preferably taken from the crank casing wherein it is compressed by the piston itself and delivered to the aforesaid ports. This cooling fluid may however be taken from any other source. Instead of delivering the cooling fluid in part through the piston and part into the cylinder direct, the whole of the cooling blast may pass into the cylinder through the piston passages or directly into the cylinder. The discharge of cooling fluid through the piston is preferably directed across the face of the piston to effect a further interchange of heat, yet I do not limit myself in this respect, but may discharge the fluid from the piston passages at any place into the cylinder. In the illustration of the application of the principle of my invention I have selected a two-cycle engine; I however desire it to be distinctly understood that my improvements are not restricted to this class of engines but may be used in other types such as the four-cycle engine without departing from the spirit of my invention.

With a view of increasing the power applied to the piston, I provide means for delivering into the engine cylinder at or near the end of the power stroke a volume of gas measured at atmospheric pressure greater than the contents of the cylinder. The introduction of such larger volume of gas permits its use, in connecting with the air blast, for expelling the last traces of combustion products, and insures in the engine cylinder a pure charge of gas under such pressure as will at the end of the compression stroke give the highest state of compression that the mixture will bear without pre-ignition. I do not broadly claim in this application the means herein shown and described for delivering to the engine cylinder a charge of combustible gases having a volume normally greater than the contents of said cylinder, as claims addressed to this subject-matter are embodied in my companion application, Sr. No. 518,089, filed September 16th, 1909.

For the purpose of effecting thorough circulation of the cooling fluid within the crank casing, I provide blades on the crank shaft which effect thorough circulation of the air therein, and assist in cooling the adjacent parts.

I have not, for the sake of clearness, deemed it necessary to illustrate the usual adjuncts of the engine, such as a carbureter, sparking device, and the like, since they constitute no part of the present invention.

The initiative idea involved is capable of receiving a variety of mechanical expressions, one of which, for the purpose of illustration, is shown in the accompanying drawings, but such drawings are not for the purpose of indicating the limits of the invention, reference being had to the claims for this purpose.

In the accompanying drawings, Figure 1 is a vertical central section taken at right angles to the crank shaft of my engine; Fig. 2 is a vertical sectional view taken through the longitudinal axis of the power shaft of the same engine; Fig. 3 is a view partly in plan and partly in section, on the line 3—3 of Fig. 1; and Fig. 4 is a similar plan and sectional view taken on the line 4—4 of Fig. 2.

Referring to Figs. 1 and 2, 1 designates a jacketed power cylinder of a two-cycle engine, 2 a pump cylinder in alinement therewith and of larger diameter, 3 a piston head working in cylinder 1, and 4 a piston head working in pump cylinder 2. The two piston heads are connected by a cylindrical body 5, the whole preferably constituting an integral structure. Closing the end of the pump cylinder is a crank casing 6 secured thereto by bolts 7, and provided with air inlet 8, in which is a spring-pressed valve 9 for controlling the entrance of air to the crank casing below the pistons.

Leading from the crank casing 6 is a conduit 10 having openings 10' 10'' delivering into the power cylinder. Port 10' is controlled by the piston 3 while port 10'' is controlled by a check valve 11. The head of the piston 3 is provided with one or more channels 12 having any desired shape or any desired number. I preferably arrange these channels in a plane parallel to the face of the piston, so that their opposite ends may converge toward openings on opposite sides of the piston. The channels on the left-hand side, as illustrated in Fig. 4, converge toward one opening which is adapted to register with port 10'. The opposite ends of the same channels or passages converge to an opening on the right-hand side of the piston, and deliver into a by-pass 13, which latter is so positioned as to direct a blast of cooling fluid leaving the piston channels across the face of the piston, and out at a suitable exhaust port 14. The diameter and length of the pump cylinder is such that the piston 4 will draw in a charge of gas through gas inlet 15, past the spring-pressed valve 16, larger in volume at normal atmospheric pressure than the capacity of the power cylinder 1. The annular space in the pump cylinder between the cylindrical portion 5 of the piston and the outer wall of the cylinder communicates past a spring-pressed valve 17 with a compression chamber 18, which opens into the power cylinder at the upper end, this opening being controlled by a valve 19 normally held in closed position by spring 20 pressing against a head 21 and operated by a tappet 22, which receives its movement from the main driving shaft 23 through a train of gearing 24, 25, 26, and 27, and vertical shaft 28. The piston 3 imparts movement to the shaft 23 through a piston rod 29 and crank arms 30. Within the casing 6 and mounted on the driving shaft 23, I preferably arrange one or more sets of dashing blades 31, whereby the air within the crank casing and below the piston may be thoroughly circulated for the purpose of distributing cold air to the piston and associated parts.

32 is a spark plug, and 33 a drain-cock in the crank casing.

The operation of the device as thus far described is as follows:—With the parts positioned as indicated in Figs. 1 and 2, it is assumed that the piston 3 has received an impetus from the previously exploded charge in the power cylinder 1, and that it has reached the forward end of the cylinder, and is in position to have its passages 12 register with port 10' and by-pass 13. The piston has thus uncovered the exhaust 14 and opened a communication through port 10' with the charge of compressed air in the crank casing 6, this charge having been previously drawn in and compressed by the piston. A cold air blast is now delivered through conduit 10 and a portion of the same is distributed through the interior of the piston through the various channels 12, emerging from the piston through the by-pass 13, where it is directed across the face of the piston to emerge through the exhaust 14. The cooling fluid as it passes through the body of the piston takes up heat therefrom and reduces its temperature. A still further cooling effect is produced by the same blast as it passes over and in contact with the face of the piston, while at the same time it assists in scavenging the products of combustion out through the exhaust port. The other portion of the cooling fluid from the conduit 10 lifts the valve 11 at the upper end of the power cylinder and drives the combustion products forward and out through the exhaust port 14 thereby preventing further interchange of heat between the products of combustion and the walls of the engine cylinder. The fluid pressure in conduit 10 readily effects the opening of valve 11 at this time because the pressure in the power cylinder is reduced below that in the fluid conduit 10, by opening exhaust port 14 to the atmosphere. After the piston 3 has opened the exhaust for the discharge of the products of combustion in cylinder 1, and a blast of cooling fluid has been delivered through the body of the piston and port 10″, the valve 19 is next opened by the properly timed movement of the tappet 22, thereby delivering from compression chamber 18 a compressed charge of fresh combustible gases into the power cylinder 1. The introduction at this moment of a fresh charge of gas the normal volume of which is larger than that of the contents of the cylinder, enables the last traces of combustible gases to be washed out through the exhaust, and by the time that the exhaust is closed by the upward movement of the piston, the power cylinder has been fully charged with a perfectly pure mixture of fresh combustible gases, and under a pressure equal to or above atmospheric pressure, depending upon the relative capacities of the power cylinder and gas pumping cylinder.

Turning now to the pump, which in operation is double-acting, the piston 4, which has previously drawn in a charge of gas through port 15, now moves upward to compress this charge, which opens valve 17 against spring pressure, and enters compression chamber 18, wherein it is held under pressure during the compression stroke and the next power stroke. When the piston 3 reaches the end of its compression stroke at dotted line 35, the charge is then under such pressure as will give the highest state of compression that the mixture will bear without pre-ignition. The charge is then ignited by operation of the sparking device 32, and the piston is driven forward, causing the piston head 4 to draw in a fresh charge of combustible gas in the pump cylinder and to compress a charge of fresh air just previously drawn into the crank casing and past valve 9. As the piston 3 uncovers the exhaust port 14 the products of combustion begin to escape therefrom. The pressure within the cylinder drops below that in the conduit 10 and a blast of air is delivered into the cylinder past valve 11, as above described. Then the piston channels 12 register with port 10′ and by-pass 13, thereby permitting another portion of the cooling fluid to pass through and cool the piston while assisting in expelling the combustion products from the cylinder and preparing for the entry of a fresh charge of combustible gases. Within the crank casing the entering air is rapidly distributed by means of the dashers on the power-shaft, thereby insuring its effective cooling of the back of the piston, crank rod and adjacent parts.

It will be evident from this construction that the positive cooling of the piston in the manner described and the rapid emptying of the cylinder of hot gases enable the engine to run at high speed without overheating. The cooling is automatic in action. The higher the speed the more rapid the cooling. The products of combustion are thoroughly scavenged from the power cylinder by the blasts of cooling air, and by the introduction of a fresh charge of combustible gases at the opposite end of the cylinder of a volume normally greater than the capacity of the cylinder; there is thus insured in the power cylinder a fresh charge of gas under such pressure as will, at the end of the compression stroke, give the highest state of compression that the mixture will bear without pre-ignition.

Obvious changes in the specific details herein described which come within the spirit of my invention, and not involving a departure therefrom, will no doubt suggest themselves to the skilled mechanic, and such changes are designed to be within the scope of my claims.

What I claim is:—

1. In an explosive engine, an engine cylinder having an exhaust port near one end thereof, a piston in said cylinder provided with a plurality of passages opening on opposite sides of the piston, a crank casing for compressing a cooling fluid, a conduit one end of which opens into said casing and the opposite end into said cylinder, said piston controlling the supply of said fluid through said conduit and passages, and means directing said fluid over the face of said piston to cool the same and scavenge the products of combustion through said exhaust port.

2. In an explosive engine, a power cylinder having a valve controlled gas inlet at one end and an exhaust port at the opposite end, a piston therein provided with air-cooled passages open to said cylinder near the end of the power stroke, means actuated by said piston on its up stroke to compress a charge of gas, and means for holding the same for delivery through said gas inlet at or near the end of the power stroke, and a crank casing for compressing air during the power stroke and delivering therefrom a blast of air through said piston passages, and means deflecting said blast of air over the face of the piston and out of said exhaust port at or near the end of the power stroke.

3. In an explosive engine, a power cylinder provided with a fluid deflecting channel, a piston in said cylinder having a fluid cooled passage, a double acting air and gas pump operated by said piston and having communication on opposite sides of its piston member with said power cylinder, said engine piston being adapted to register its passage with one of said communications and with said channel at or near the end of its power stroke for the purpose of admitting a blast of air through said piston and over its face to cool said piston and expel products of combustion from said cylinder.

4. In an explosive engine, an engine cylinder having an exhaust port near one end thereof, a piston in said cylinder provided with a cooling passage, fluid compression means, a conduit opening into said cylinder at points on opposite sides of said exhaust port and connected with said compression means, said piston controlling said exhaust port and supply of fluid through one of said openings and passage, means directing said fluid over the face of said piston to cool the same and scavenge the products of combustion through said exhaust port and valve means for controlling the other of said openings.

5. In an explosive engine, a power cylinder having an air inlet port at or near each end of said cylinder and an exhaust port intermediate the said air ports, a compression chamber for supplying combustible gas under pressure to said cylinder, a piston in said cylinder provided with an air cooled passage, a double acting air and gas pump having communication on one side of its piston member with said cylinder through said compression chamber and on the opposite side of said piston member with said cylinder through said air ports and piston passage at or near the end of the power stroke and means directing the flow of air over the face of said piston to cool the same and scavenge the exhaust gases through said exhaust port.

6. In an explosive engine, a power cylinder provided with means for supplying combustible gas thereto under pressure, a piston working in said cylinder and having an air cooled passage adapted to open into said cylinder at the end of the power stroke, said cylinder having a valve controlled air inlet port and a second air inlet port controlled by said piston and located to register with said piston passage at the end of the power stroke and means for supplying air under pressure to said cylinder through said air inlet ports.

7. In an explosive engine, a power cylinder having at or near one end a valve controlled air inlet port and a valve controlled combustible gas supply port and at or near the opposite end and on the same side of the cylinder an exhaust port and an air inlet port, a piston working in said cylinder controlling said last named ports and having an air cooling passage adapted to register with said last named air inlet port at the end of the power stroke, a stationary deflector in operative relation with said last named inlet port and piston passage to direct an air blast over the face of the piston and means for supplying combustible gas to said gas supply port.

8. In an explosive engine, a power cylinder having an air inlet port at or near each end of said cylinder and an exhaust port intermediate said ports, a piston working in said cylinder controlling the exhaust port and one air inlet port and having an air-cooled passage, a double acting air and gas pump operated by said piston to take in a charge of gas on the power stroke and compress the same on the reverse stroke for introduction into said cylinder at or near the end of the next power stroke and to take in a charge of air on the up-stroke and to deliver a blast of air into said cylinder through said air inlet ports and piston passage at or near the end of the power stroke, and means for directing said blast over the face of said piston and out of said exhaust port.

9. In an explosive engine, a power cylinder having an air inlet port and an exhaust port on the same side of the cylinder, a piston working therein and having an air cooled passage, a double acting pump operated by said piston to take in a charge of gas on the power stroke and compress the same on the reverse stroke for introduction into said cylinder at or near the end of the next power stroke and to take in a charge of air on the compression stroke and to deliver a blast of air into said cylinder through said air inlet ports and piston passage at or near the end of the power stroke, and means for directing said blast over the face of said piston and out of said exhaust port.

In testimony whereof I have signed this specification in the presence of two subscribing witnesses.

DAVID H. COLES.

Witnesses:
 RALPH L. SCOTT,
 WILLARD H. HARTING.